US011971197B2

United States Patent
Al-Ansary et al.

(10) Patent No.: US 11,971,197 B2
(45) Date of Patent: Apr. 30, 2024

(54) SOLID PARTICLE RECEIVER WITH POROUS STRUCTURE FOR FLOW REGULATION AND ENHANCEMENT OF HEAT TRANSFER

(71) Applicant: King Saud University, Riyadh (SA)

(72) Inventors: Hany Al-Ansary, Riyadh (SA); Abdelrahman El-Leathy, Riyadh (SA); Zeyad Al-Suhaibani, Riyadh (SA); Saeed Al-Zahrani, Riyadh (SA); Sheldon Jeter, Atlanta, GA (US); Said Abdel-Khalik, Tucker, GA (US); Dennis Sadowski, Atlanta, GA (US); Matthew Golob, Atlanta, GA (US)

(73) Assignee: KING SAUD UNIVERSITY, Riyadh (SA)

(*) Notice: Subject to any disclaimer, the term of this patent is extended or adjusted under 35 U.S.C. 154(b) by 0 days.

(21) Appl. No.: 15/642,697

(22) Filed: Jul. 6, 2017

(65) Prior Publication Data

US 2017/0314817 A1 Nov. 2, 2017

Related U.S. Application Data

(62) Division of application No. 13/623,895, filed on Sep. 21, 2012, now Pat. No. 9,732,986.

(Continued)

(51) Int. Cl.
*F24S 10/80* (2018.01)
*F24S 20/20* (2018.01)
(Continued)

(52) U.S. Cl.
CPC ............. *F24S 10/80* (2018.05); *F24S 20/20* (2018.05); *F24S 23/70* (2018.05); *F24S 70/16* (2018.05);
(Continued)

(58) Field of Classification Search
CPC .. F24S 10/80; F24S 20/20; F24S 23/70; F24S 70/16; F24S 70/30; Y02E 10/41; Y02E 10/44; Y02E 10/40
(Continued)

(56) References Cited

U.S. PATENT DOCUMENTS 2,615,703 A 10/1952 Weber
3,894,528 A 7/1975 Stubblefield
(Continued)

FOREIGN PATENT DOCUMENTS

CN 101122425 A * 2/2008 ............. F24S 20/20
EP 0151045 A2 * 8/1985 ............. F24S 70/16

OTHER PUBLICATIONS

Hruby, J.M., "A Technical Feasibility Study Of A Solid Particle Solar Central Receiver For High Temperature Applications," SAND86-8211, Solar Central Receiver Components Division, Sandia National Laboratories, Livermore, Mar. 1986, pp. 3-77.
(Continued)

*Primary Examiner* — Steven B McAllister
*Assistant Examiner* — Benjamin W Johnson
(74) *Attorney, Agent, or Firm* — HAUPTMAN HAM, LLP

(57) ABSTRACT

There is disclosed a receiver panel. In an embodiment, the panel is configured to receive a curtain of particles in a solar central receiver system. A porous structure of the panel has a top end and a bottom end. The porous structure is disposed between the top end and the bottom end. The porous structure has a size to impede movement of the particles during downward travel from the top end to the bottom end. There is disclosed a solar central receiver system. In an embodiment, the receiver system includes a plurality of receiver panels, a tower supporting the plurality of receiver panels in a configuration to receive solar irradiation, and a
(Continued)

hopper forming a slot configured to dispose the particles at a given location on to the porous structure. Other embodiments are also disclosed.

20 Claims, 12 Drawing Sheets

Related U.S. Application Data

(60) Provisional application No. 61/537,568, filed on Sep. 21, 2011.

(51) Int. Cl.
    *F24S 23/70*     (2018.01)
    *F24S 70/16*     (2018.01)
    *F24S 70/30*     (2018.01)

(52) U.S. Cl.
    CPC .............. *F24S 70/30* (2018.05); *Y02E 10/40* (2013.01); *Y02E 10/44* (2013.01)

(58) Field of Classification Search
    USPC ........................................................ 126/680
    See application file for complete search history.

(56) References Cited

U.S. PATENT DOCUMENTS

| | | | |
|---|---|---|---|
| 3,908,632 A | 9/1975 | Poulsen | |
| 4,018,211 A | 4/1977 | Barr | |
| 4,055,948 A * | 11/1977 | Kraus | F03G 6/067 60/641.8 |
| 4,158,385 A | 6/1979 | Vandenhoeck | |
| 4,403,601 A | 9/1983 | Hunt | |
| 4,513,733 A * | 4/1985 | Braun | F24S 80/20 166/57 |
| 4,643,168 A * | 2/1987 | Butler | F24S 10/80 126/650 |
| 4,777,934 A | 10/1988 | De Laquil, III | |
| 7,033,570 B2 | 4/2006 | Weimer et al. | |
| 7,690,377 B2 | 4/2010 | Goldman et al. | |
| 8,109,265 B1 * | 2/2012 | Kolb | F24S 20/20 126/684 |
| 2005/0210876 A1 * | 9/2005 | Karni | F24S 20/20 60/641.15 |
| 2010/0242352 A1 * | 9/2010 | Perkins | C01B 3/22 44/639 |
| 2011/0067398 A1 * | 3/2011 | Slocum | F28D 20/02 60/641.1 |

OTHER PUBLICATIONS

International Search Report and Written Opinion dated Mar. 25, 2013 for PCT/US12/56454, 9 pp.

* cited by examiner (a) Overview of Central Receiver System (b) Solid particle receiver (c) Solid particles flowing through the cavity

SOLID PARTICLE RECEIVER WITH POROUS STRUCTURE FOR FLOW REGULATION AND ENHANCEMENT OF HEAT TRANSFER

REFERENCE TO PENDING PRIOR PATENT APPLICATION

The present application is a Divisional of U.S. patent application Ser. No. 13/623,895, filed Sep. 21, 2012, which claims the benefit under 35 U.S.C. 119 (e) of U.S. Provisional Patent Application No. 61/537,568, filed Sep. 21, 2012, by Hany A. Al-Ansary, et al., for "CERAMIC FOAM SOLAR SOLID PARTICLE RECEIVER," which patent application is hereby incorporated herein by reference.

BACKGROUND

The general concept of a cavity receiver 5 for a solar central receiver system 10 can be described as follows. Sunlight is reflected from many mirrors (heliostats), such that most of the reflected sunlight is focused on one small area 15 at the top of a tower 20. At that location, the concentrated sunlight is allowed to pass through the aperture of a cavity. The intense solar radiation entering the cavity is then used to heat a material, usually a fluid. The heat absorbed by the fluid can then be used to generate power in a variety of ways.

A different design, called the solid particle receiver, was first conceived in the 1980s. In this design, the material being heated within the cavity is solid particles 25 rather than a fluid. In the tests conducted on this concept, the solid particles were released from a long narrow slot located at the top of the cavity and were allowed to fall freely, forming what may be called a "curtain". The concentrated sunlight passing through the aperture was captured directly by the solid particle curtain. As a result, the temperature of the solid particles rose significantly. See, for example, FIG. 1.

SUMMARY

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

In an embodiment, there is provided a receiver panel, configured to receive a curtain of particles in a solar central receiver system, the panel comprising a porous structure having a top end and a bottom end, the porous structure disposed between the top end and the bottom end, and the porous structure having a size to impede movement of the particles during downward travel from the top end to the bottom end.

In another embodiment, there is provided a solar central receiver system, comprising a plurality of receiver panels, an individual receiver panel configured to receive a curtain of particles, the panel comprising a porous structure having a top end and a bottom end, the porous structure disposed between the top end and the bottom end, and the porous structure having a size to impede movement of the particles during downward travel from the top end to the bottom end; a tower having an upper portion and a lower portion, the upper portion supporting the plurality of receiver panels in a configuration to receive solar irradiation; and a hopper positioned at a height above the plurality of receiver panels, the hopper forming a slot configured to dispose the particles at a given location on to the porous structure.

In yet another embodiment, there is provided a pipe configured to receive particles in a solar central receiver system, the pipe comprising an inlet portion not necessarily circular in cross section having a first cross section area, the inlet portion forming a passageway sized to transmit at least one of a fluid (such as a molten slat or other fluid) and a stream of solid particles; an outlet portion having a second shape and cross section area, the outlet portion forming a passageway sized to transmit the at least one of the fluid and the stream of solid particles; and a porous structure disposed between the inlet portion and the outlet portion, the porous structure having a size to impede movement of the at least one of the fluid and the stream of solid particles during downward travel from the inlet portion to the outlet portion.

In still another embodiment, there is provided a method of capturing solar energy with a solar central receiver system, the method comprising releasing a curtain of particles into a cavity configured to receive solar irradiation; and increasing a resident time of the curtain of particles falling through the cavity with a porous structure impeding the fall of the particles.

Other embodiments are also disclosed.

Additional objects, advantages and novel features of the technology will be set forth in part in the description which follows, and in part will become more apparent to those skilled in the art upon examination of the following, or may be learned from practice of the technology.

BRIEF DESCRIPTION OF THE DRAWINGS

Non-limiting and non-exhaustive embodiments of the present invention, including the preferred embodiment, are described with reference to the following figures, wherein like reference numerals refer to like parts throughout the various views unless otherwise specified. Illustrative embodiments of the invention are illustrated in the drawings, in which.

DETAILED DESCRIPTION

Overview

Embodiments are described more fully below in sufficient detail to enable those skilled in the art to practice the system and method. However, embodiments may be implemented in many different forms and should not be construed as being limited to the embodiments set forth herein. The following detailed description is, therefore, not to be taken in a limiting sense.

Figure 1:
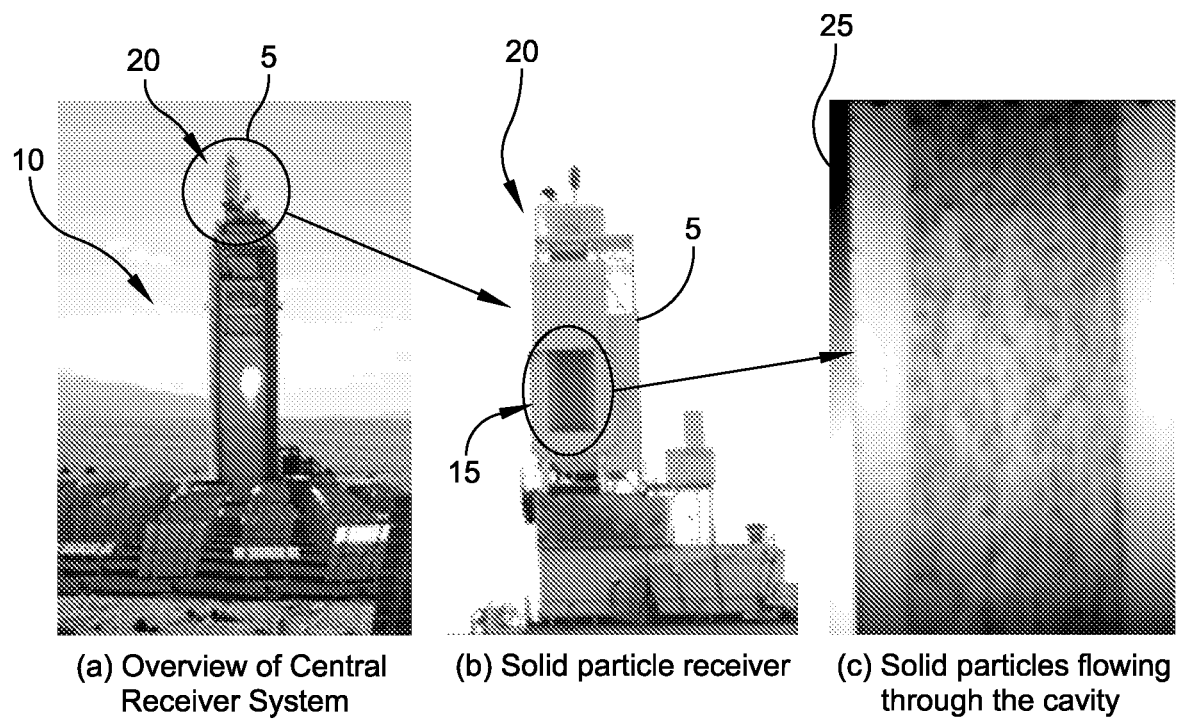
FIG. 1 illustrates prior art experiments on the solid particle receiver concept at Sandia National Laboratories.

The actual conversion efficiency of the system shown in FIG. 1 was relatively low for two main reasons:
1) Due to their free-fall from the long narrow slot, the solid particles 25 quickly attain high velocities such that there is not enough residence time for the particles to attain very high temperatures.
2) The presence of voids between the falling solid particles allows some of the incoming concentrated sunlight to penetrate the solid particle curtain 25 and hit the back wall of the cavity, instead of being directly utilized to heat the solid particles.

Figure 2:
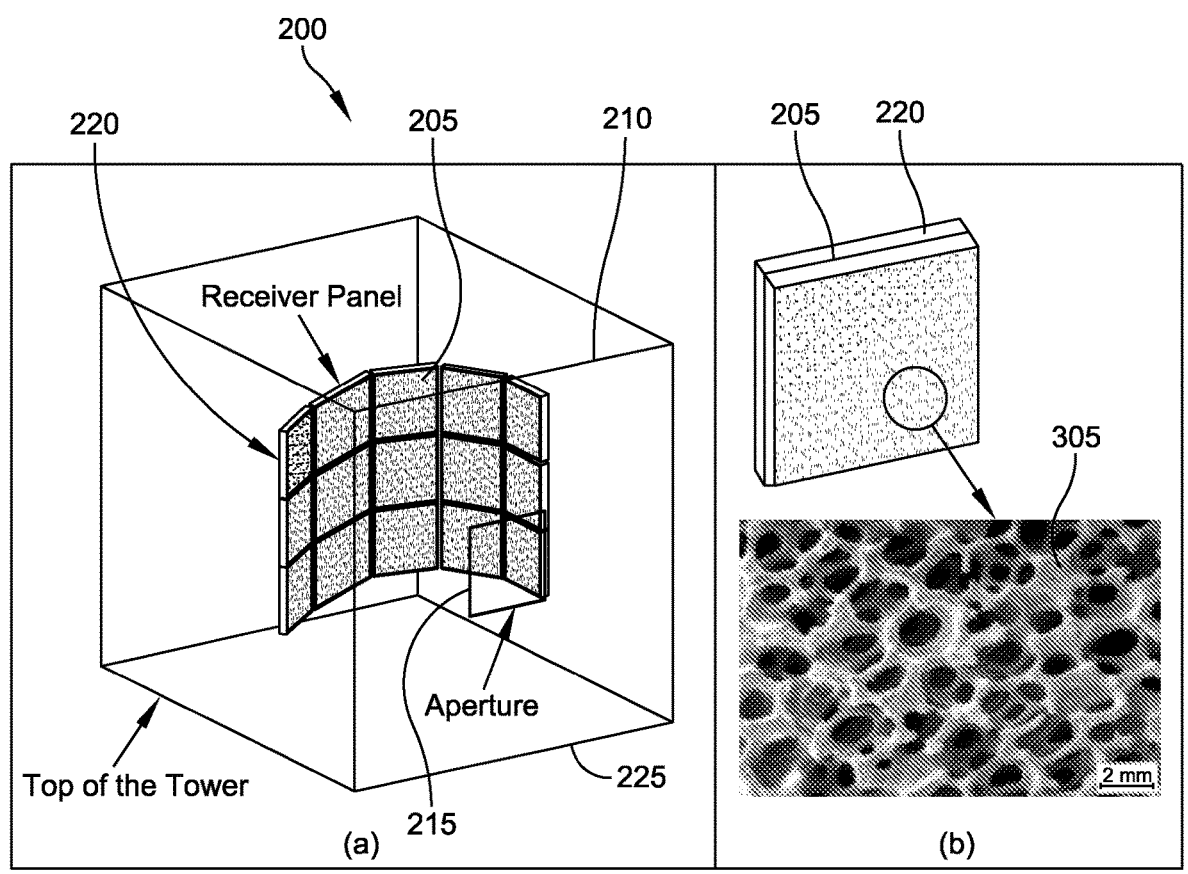
FIG. 2 illustrates a general description of the cavity receiver, (a) illustrates a general layout of the receiver inside the tower, and (b) illustrates a composition of a single receiver panel.

Embodiments described herein overcome issues with other solid particle receivers, and also add other enhancing features. FIG. 2 shows a general layout of a new receiver design 200, which constitutes a core embodiment.

In one embodiment, the receiver consists of multiple panels 205 that are installed inside a cavity 210 having an aperture 215 and arranged in a general curved shape. The backsides 220 of all panels 205 may be fixed to a structure that can be easily assembled of disassembled for maintenance purposes. Cavity 210 is disposed at a top portion of a tower 225.

In an embodiment, each panel may include three components: a porous structure (e.g., a foam block); a back plate; and an insulation block. However, the exact composition of the each panel may vary depending on design and operating conditions.

Figure 3:
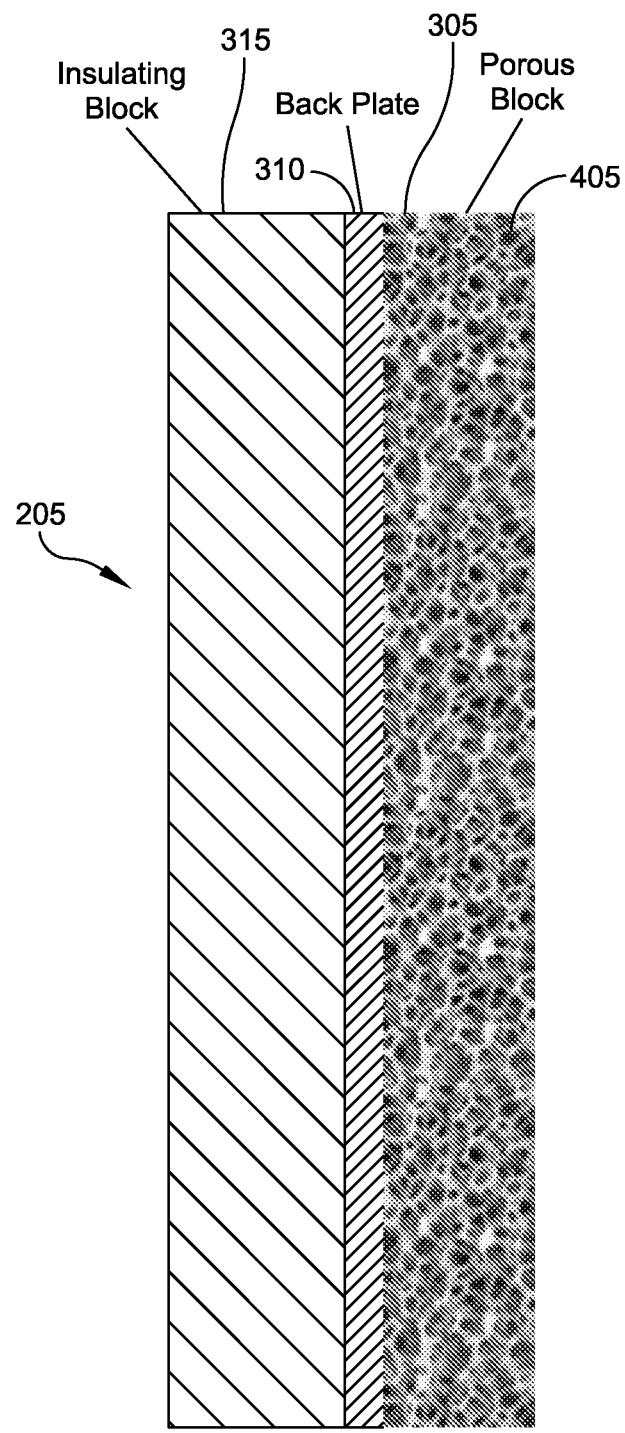
FIG. 3 illustrates side view of the panel, showing one structural exemplary embodiment.

FIG. 3 is illustrative of an embodiment of a receiver panel 205 having different layers and is a side view. These layers may include a porous block 305 (or other porous structure 305). A back plate 310 may be provided together with an insulation block 315.

The following is a description for a working procedure of an exemplary embodiment (see FIG. 4):

Solid particles 25 are released from one or more hoppers through a long slender slot and allowed to flow by virtue of gravity. The hoppers are made of appropriate size and flow regulation capabilities.

Right after the point of release, the solid particles 25 are immediately allowed to go through the porous block 305. The presence of numerous ligaments 405 within the porous structure 305 causes the solid particles 25 to collide with those ligaments 405, thereby impeding their movement and reducing their speed.

As the solid particles 25 trickle down the porous block 305, the originally narrow "curtain" of solid particles 25 may spread. This depends on a number of parameters. The "curtain" spreads in the direction transverse to the general downward direction of solid particle movement due to the aforementioned collisions with the ligaments of the porous structure.

As the concentrated sunlight irradiates the porous block 305, the solar radiation may be partially absorbed by the slow-moving solid particles. Furthermore, any radiation that penetrates through the voids between solid particles 25 may mostly be absorbed by the ligaments 405 of the porous material 305 which, in turn, will transfer the heat to the solid particles 25.

Figure 4:
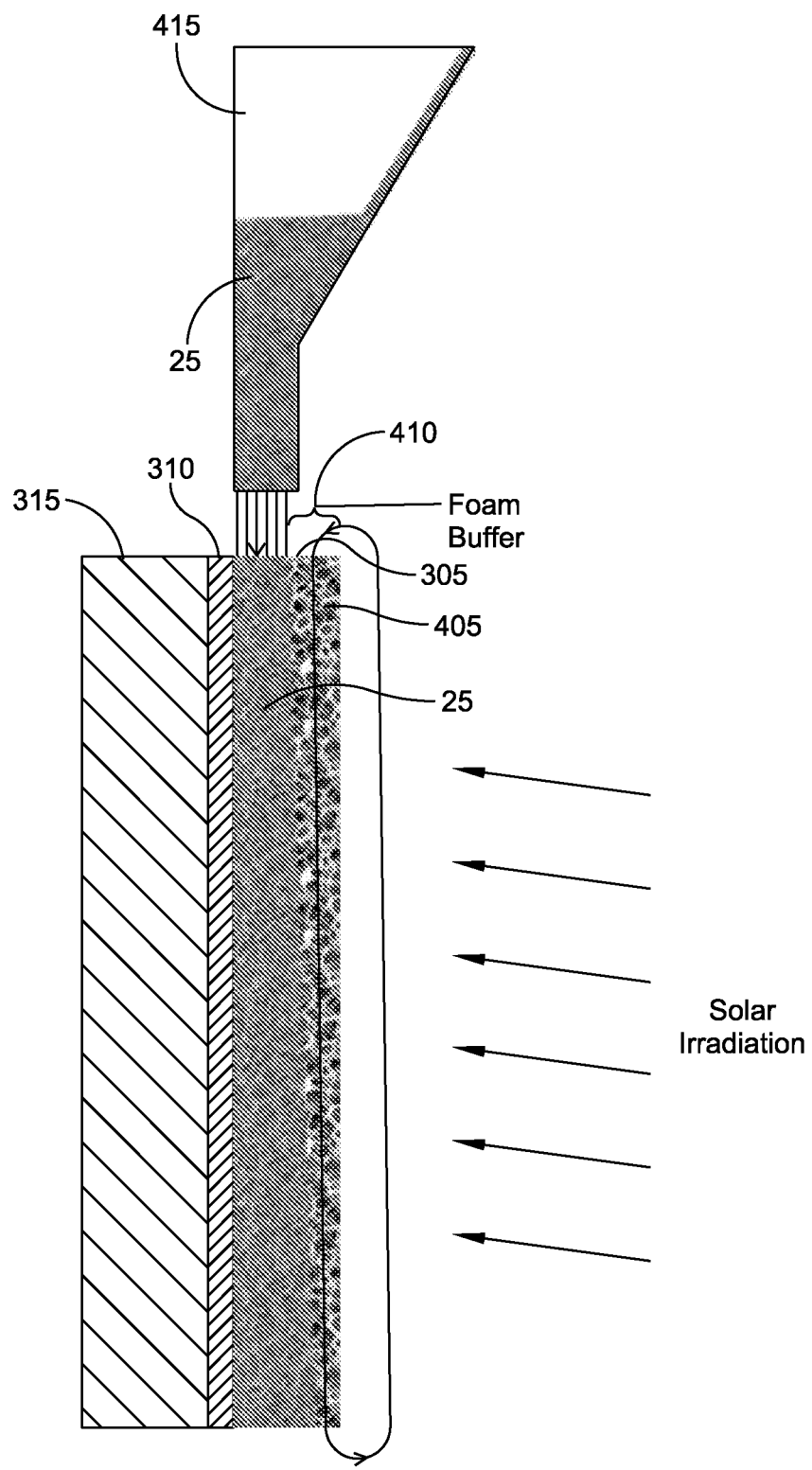
FIG. 4 illustrates an exemplary embodiment of solid particle flow within the porous structure.

As FIG. 4 shows, it is preferable to have the point of release of solid particles 25 retarded or recessed from the front face of the porous foam block 25. This minimizes radiation reflected by the solid particles 25, which may not have optimal absorption.

Since solid particles 25 do not flow through a portion of the porous block 405, referred to as foam buffer 410, the buffer 410 is expected to be somewhat hotter than the solid particles. However, the particles 25 flow just behind the buffer 410 induce air flow through the buffer 410 to cause cooling.

The depth of the foam buffer 410 depends on the dispersion of solid particles 25 during trickle down through the porous foam block. This dispersion depends on a number of parameters, including grain size, initial and terminal velocity, particle sheet thickness, and the porosity and density of the porous foam.

Another feature that could be employed is preheating of solid particles prior to reaching one or more of the hoppers 415. This can be done by taking advantage of the hot air that is expected to accumulate at the top of the cavity. The ramp that leads to the one or more hoppers can be designed in a way such that it will be in contact with the hot air. On the other side of the ramp, solid particles can slide down at relatively high speed, getting heated in the process, and making use of the expected high heat transfer coefficient.

This embodiment overcomes the issues encountered in earlier solid particle receiver designs in a number of ways:

By employing a cavity receiver 205, radiation losses are minimized.

Collision of the solid particles 25 with the numerous ligaments 405 inside the porous block causes the flow of solid particles 25 to be impeded and its velocity to be reduced, thereby providing the solid particles 21 with longer residence time to absorb more energy.

The reduced velocity of solid particles 25 also reduces the voids between the particles 25. Furthermore, even if some of the sunlight penetrates the voids between the solid particles 25, it will be absorbed by ligaments 405 within the porous block 305, which in turn, indirectly contributes to heating the solid particles 25. Therefore, the solar energy conversion efficiency may be rather high.

Since most of the flowing solid particles 25 will be contained within the porous block 305, solid particle drift due to wind is expected to be very small compared to other designs.

Finally, instead of porous blocks 305, an embodiment can also be realized by the use of mesh screens, including metallic mesh screens or mesh screens made of other materials.

Staggered Series

In this embodiment, the velocity of solid particles is reduced intermittently by the use of obstacles of various forms.

Staggered Blocks or Meshes

Figure 5:
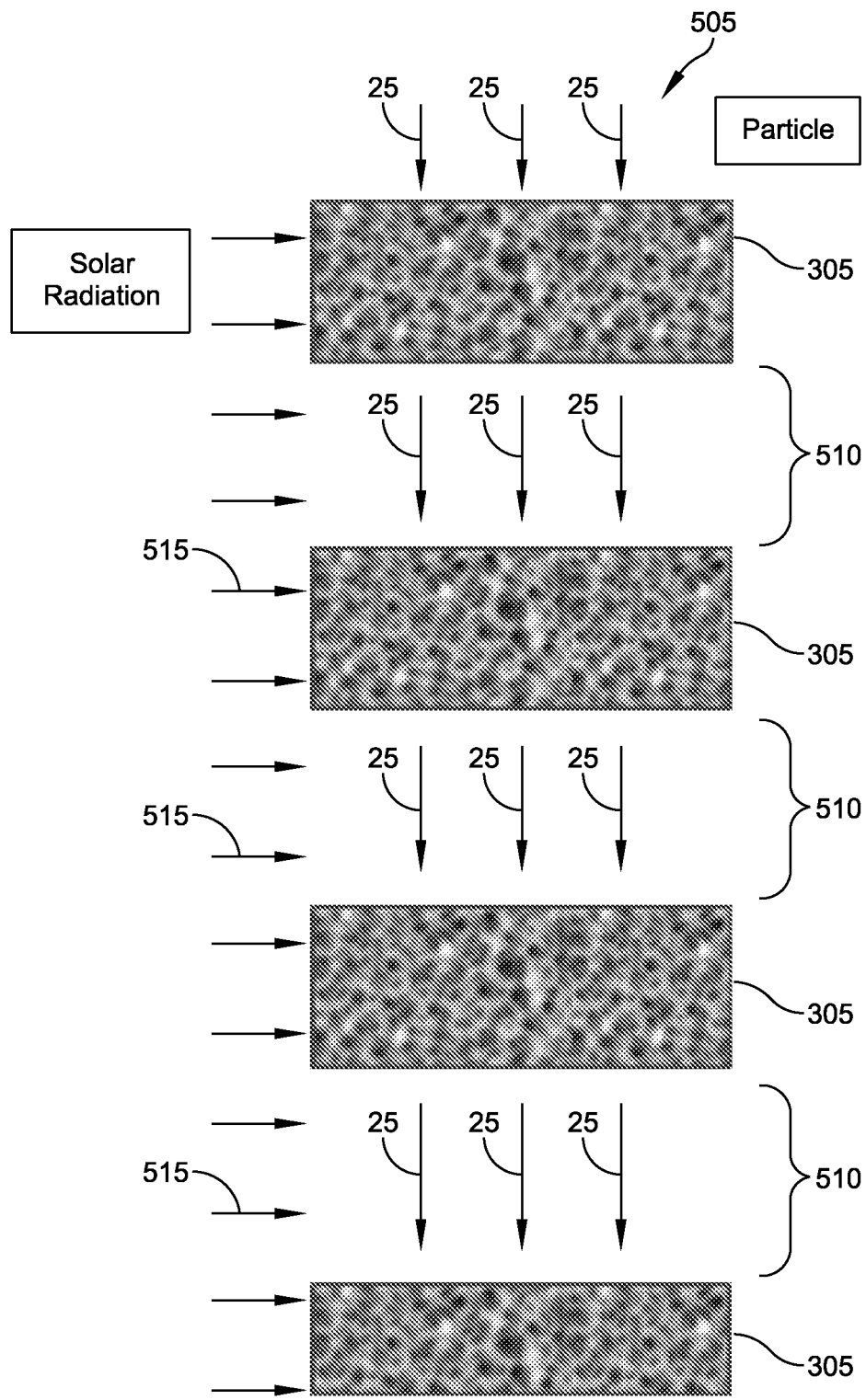
FIG. 5 illustrates an exemplary embodiment of a staggered series having a staggered block formation.

FIG. 5 illustrates an embodiment of a staggered series of porous foam blocks 305 (or meshes 305) arranged vertically to temporarily arrest the free fall of particles 25 and form a panel 505 configured to be irradiated by concentrated sunlight 515. The spacing 510 of the blocks/meshes 305 is set to control the overall residence time of the particles 25 from their point of release to their point of collection. In this variation, solid particles 25 are irradiated directly during their travel between blocks 305.

Figure 6:
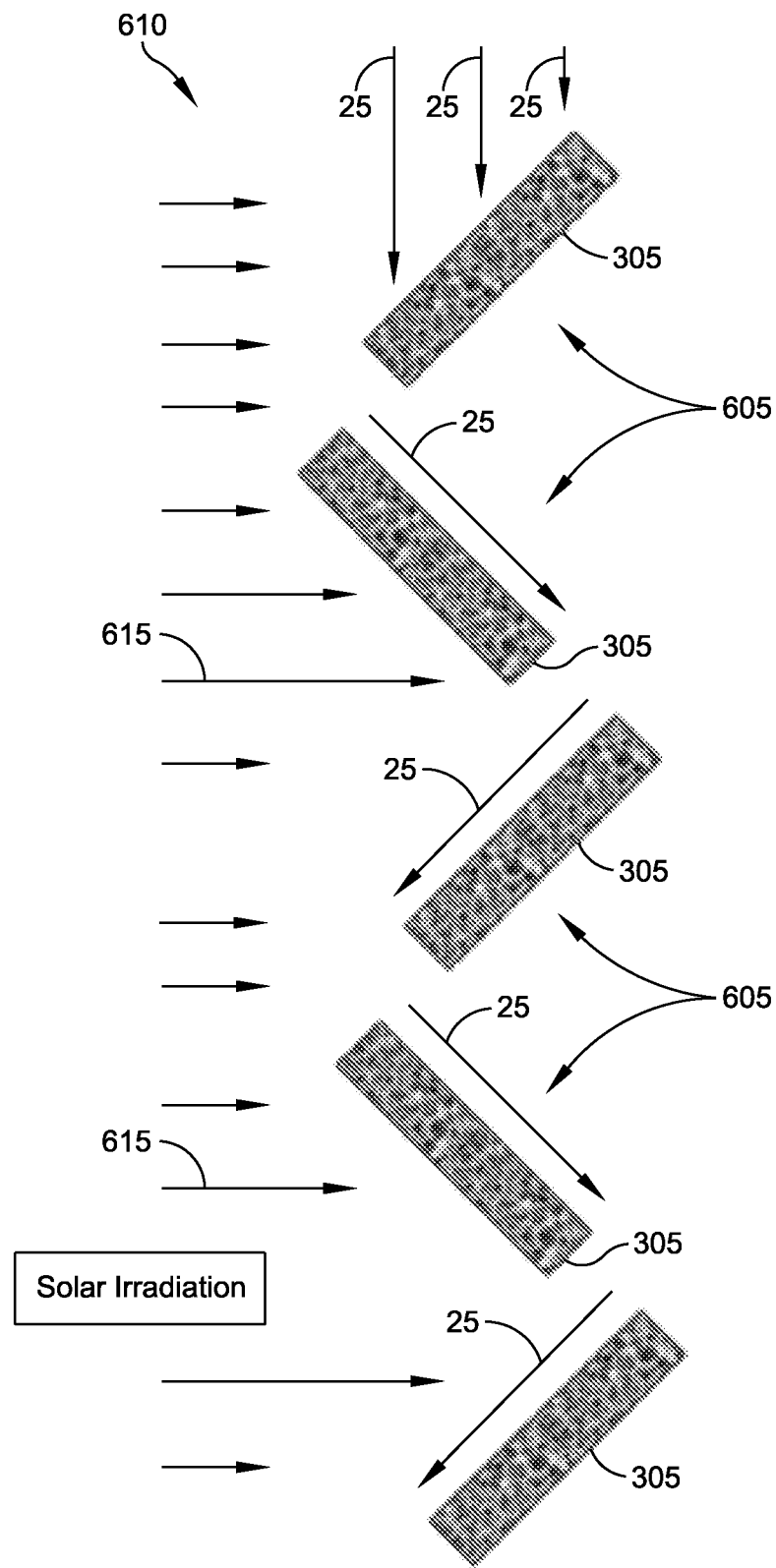
FIG. 6 illustrates an exemplary embodiment of staggered series embodiment having a zig-zag pattern.

FIG. 6 illustrates an embodiment of slanted porous foam blocks 305 (or meshes 305 or solid plates 305) arranged in a zig-zag pattern 605 to temporarily arrest the free fall of particles 25 and form a panel 610 to be irradiated by concentrated sunlight 615. The spacing and angle of the blocks/meshes/plates 305 are set to control the overall residence time of the particles 25 and heat the particles passing through the irradiated panel 610.

Surface with Front Holes

Figure 7:
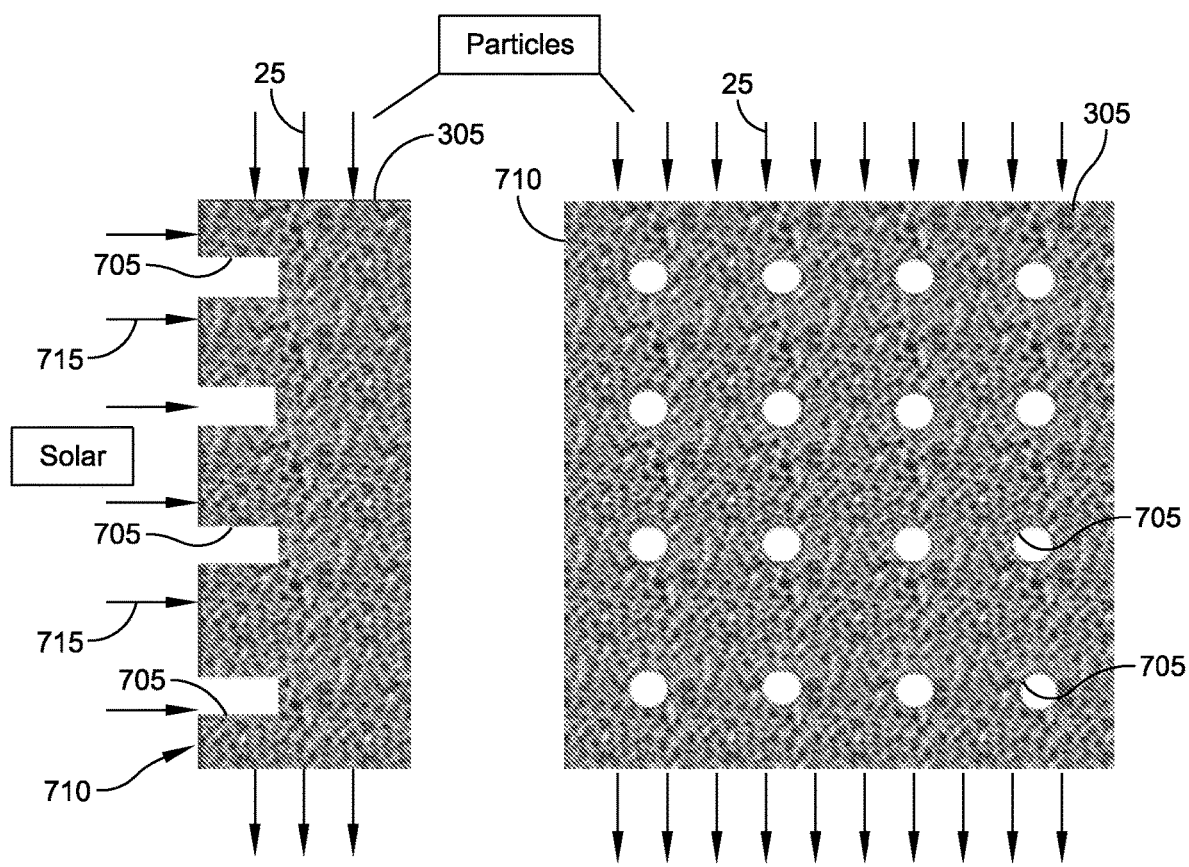
FIG. 7 illustrates an exemplary embodiment of a porous foam block with indented holes.

In this embodiment, and referring to FIG. 7, a porous foam block 305 (or mesh screens 305) similar to those described above have indented holes 705 in the front surface 710 of the block 305 and arranged in a manner so as to influence the flow of particles 25 and form a panel configured to be irradiated by concentrated sunlight 715. In this embodiment, more solid particles are allowed to absorb direct sunlight. The spacing of the holes 705 is set to control the overall residence time of the particles 25 and heat the particles passing through the irradiated panel.

Finned Pipe

Figure 8:
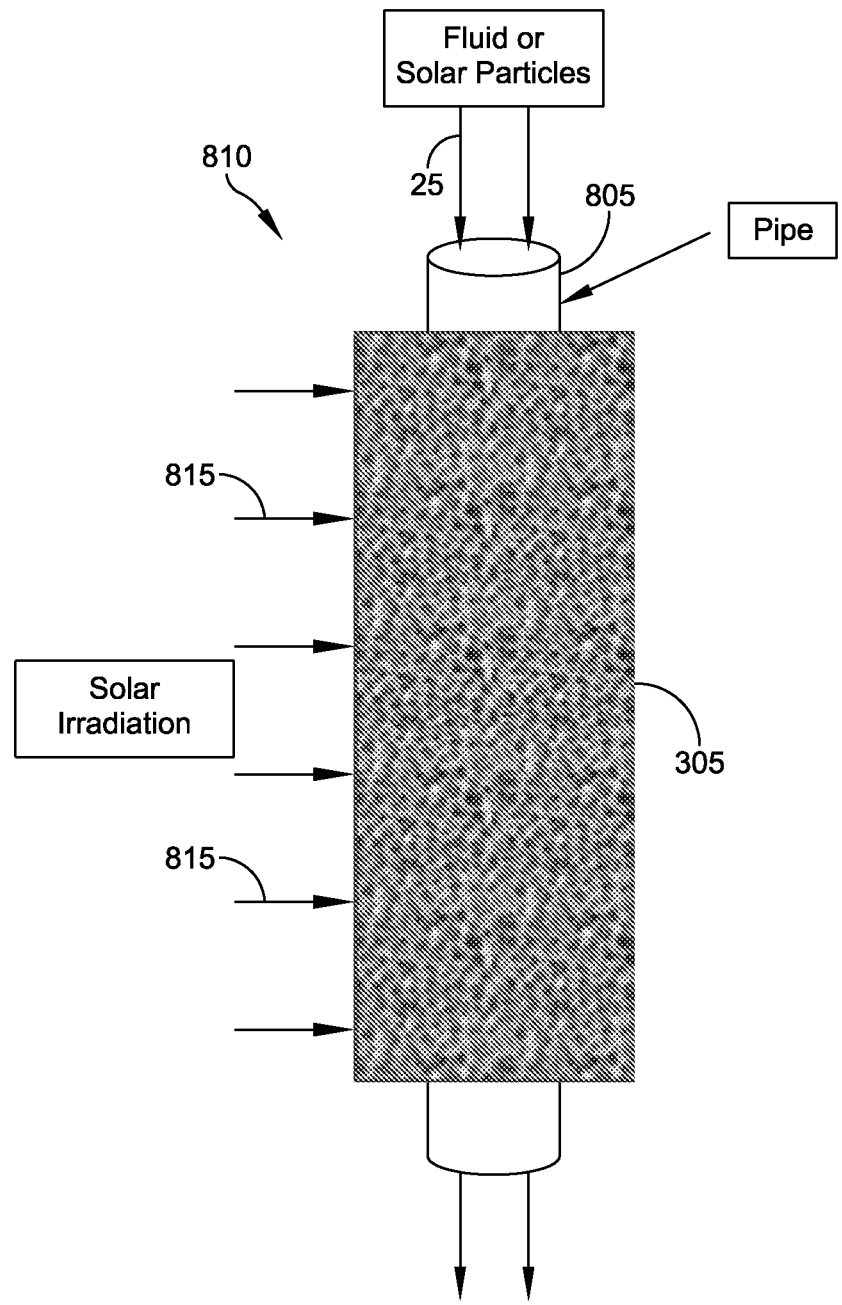
FIG. 8 illustrates an exemplary embodiment of a finned pipe.

In this embodiment, and referring to FIG. 8, a porous foam block 305 or mesh screens 305 encase a pipe to form a panel 810 to be irradiated by concentrated sunlight 815. A fluid 25 (or solid particles 25) may move through the pipe 805 and become heated as it passes though the irradiated panel 810. In this embodiment, the porous foam block 305 (or mesh screen) 305 acts as fins that enhance the heat transfer to the pipe 805 due to the large internal surface area. In various embodiments, the pipe may be configured to receive particles in a solar central receiver system. The pipe may include an inlet portion, which may be circular or other shapes (i.e., the pipe is not necessarily circular in cross section.) The pipe may have a first cross section area. The inlet portion may form a passageway sized to transmit at least one of a fluid (such as a molten salt or other fluid), a stream of solid particles, or both the fluid and stream of solid particles. An outlet portion may be provided having a second shape and cross section area. The outlet portion may form a passageway sized to transmit one or both of the fluid or the stream of solid particles. A porous structure may be disposed between the inlet portion and the outlet portion. The porous structure may have a size to impede movement of the fluid, the stream of solid particles, or both, during downward travel from the inlet portion to the outlet portion.

In addition to the basic embodiments described earlier, there are a number of other considerations regarding materials used in building the receiver, working materials, surface treatment, as well as receiver location and arrangement.

Receiver Materials

The receiver panel may be made of any material that possesses high thermal conductivity and high-temperature durability. However materials of particular interest are silicon carbide, zirconia, titanium oxide, tungsten, and high-temperature steel alloys.

Working Materials

It is preferable that particulate materials used in conjunction with the embodiments discussed above possess have high absorptivity, small grain size, high melting point, and high cycling durability. Of particular interest are silica sand, fracking said, and fracking alumina beads. In an embodiment, a stream of particles may include a combination of a first set of particles and a second set of particles. The first set of particles may include natural particles having a given solar absorptivity. The second set of particles may include artificially created particles having a solar absorptivity greater than the first set of particles. In one embodiment, the higher absorptivity particles may be captured and recirculated through the receiver.

Surface Treatment

The surface which receives the incoming concentrated sunlight may be treated in many different ways. The following are exemplary surface treatments:

Natural Open Face

This is the surface type described in embodiments discussed above. However, the surface may have a coating to increase absorptivity to solar irradiation.

Opaque Surface

Figure 9:
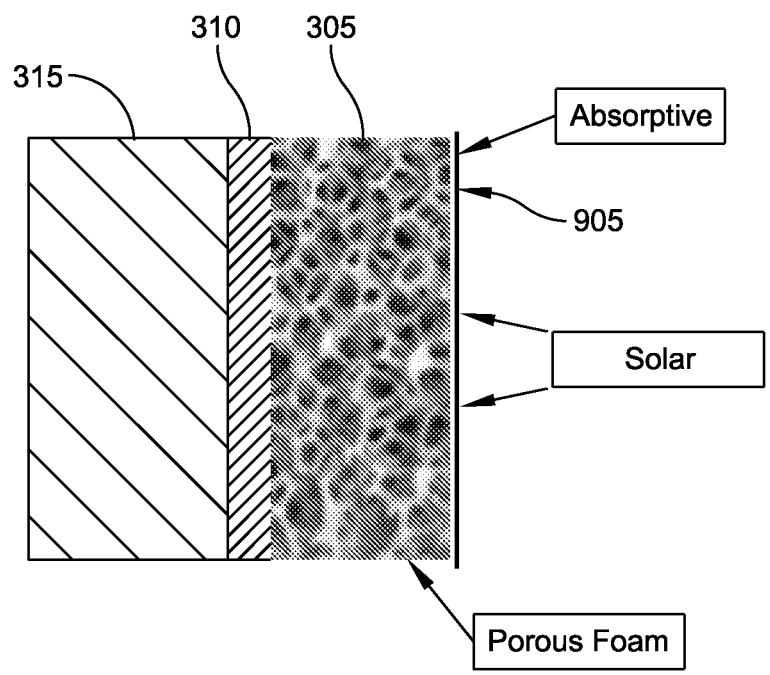
FIG. 9 illustrates an exemplary embodiment of opaque surface.

This is a surface that is sealed to prevent particles from escaping (see, for example, FIG. 9). As in the previous case, the surface may be treated with a coating 905 to increase absorptivity to solar irradiation.

Transmissive Cover

Figure 10:
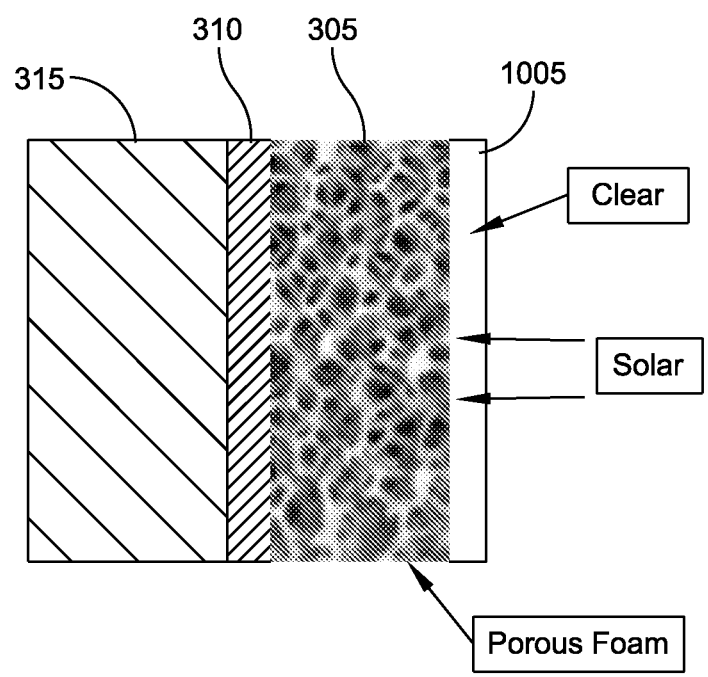
FIG. 10 illustrates an exemplary embodiment of transmissive cover.

This is a clear layer 1005 over the front face to prevent particles from escaping and allow direct transmission of solar irradiation (see, for example, FIG. 10). A potential material for this layer is quartz.

Mesh Surface

Figure 11:
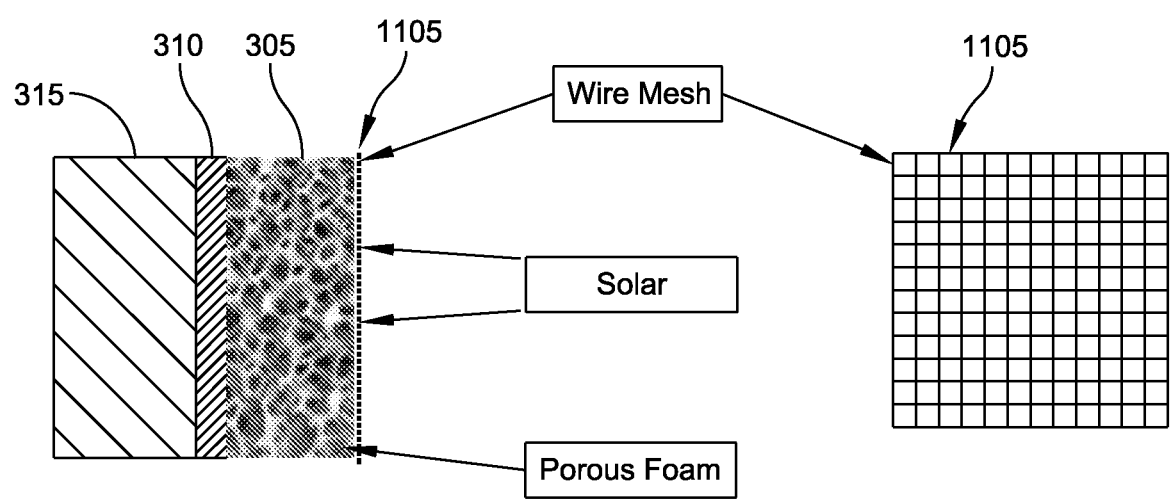
FIG. 11 illustrates an exemplary embodiment of mesh surface.

This is a mesh layer 1105 over the front face to partially prevent particulates from escaping and partially allow direct transmission of solar irradiation (see, for example, FIG. 11). The mesh may be made of a high-temperature material such as tungsten.

Receiver Location and Arrangement

The receiver may be located inside a cavity, with a number of panels, and may be arranged in a generally curved shape. However, there are other possibilities for location of the receiver and its arrangement.

Simple Cavity

Figure 12:
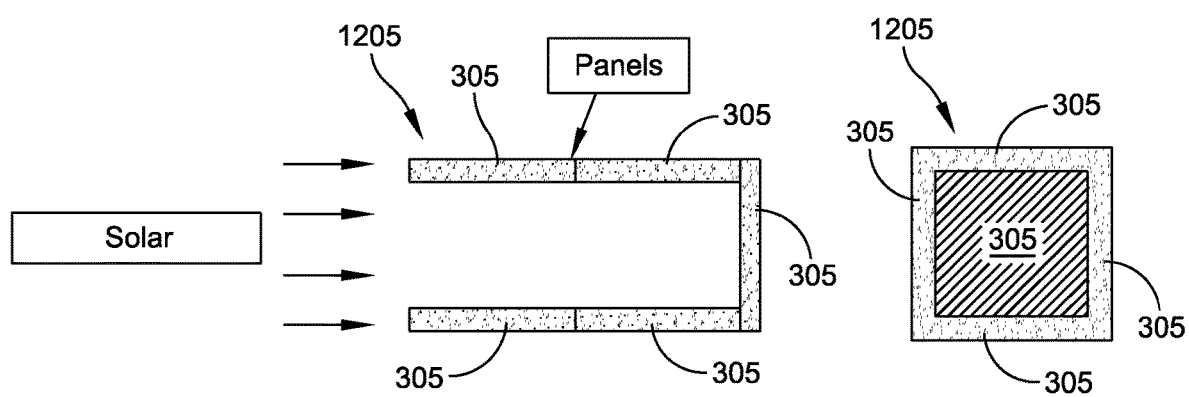
FIG. 12 illustrates an exemplary embodiment of a simple cavity.

FIG. 12 illustrates a cavity 1205 with a general cubic shape, and the receiver is made of multiple panels 305 lining the sides of the cavity.

Flat Receiver

In its simplest form, the receiver can be flat, consisting of one or more panels. In this case, the receiver is not enclosed within a cavity.

Although the above embodiments have been described in language that is specific to certain structures, elements, compositions, and methodological steps, it is to be understood that the technology defined in the appended claims is not necessarily limited to the specific structures, elements, compositions and/or steps described. Rather, the specific aspects and steps are described as forms of implementing the claimed technology. Since many embodiments of the technology can be practiced without departing from the spirit and scope of the invention, the invention resides in the claims hereinafter appended.

What is claimed is:

1. A solid particle receiver configured to receive solid particles in a solar central receiver system, the solid particle receiver comprising:
    an inlet portion having a first cross-sectional opening, the inlet portion forming a passageway sized to transmit a stream of solid particles;
    an outlet portion forming a passageway sized to transmit the stream of solid particles;
    a solid particle passageway disposed between the inlet portion and the outlet portion; and
    a porous structure disposed in the solid particle passageway between the inlet portion and the outlet portion, wherein the inlet portion is positioned above the outlet portion so that the stream of solid particles falls down, under the force of gravity, through the porous structure, the porous structure having a porosity that impedes movement of the stream of solid particles during downward travel from the inlet portion to the outlet portion, and wherein the porous structure has ligaments that facilitate dispersion of the solid particles through the porous structure between the inlet portion and the outlet portion.

2. The solid particle receiver of claim 1, wherein the porous structure includes a series of foam blocks.

3. The solid particle receiver of claim 1, wherein the porous structure includes a foam buffer.

4. The solid particle receiver of claim 2, wherein at least one foam block of the series of foam blocks is arranged at an angle with respect to a vertical axis.

5. A method of capturing solar energy with a solar central receiver system, the method comprising:
    releasing solid particles that form a curtain of solid particles at a point of release into a cavity configured to receive solar irradiation; and
    increasing a resident time of the curtain of solid particles falling through the cavity with a porous foam structure that impedes the fall of the solid particles; wherein the point of release of the curtain of solid particles is above the porous foam structure so that the curtain of solid particles falls down, under the force of gravity, through the porous foam structure; and wherein the porous foam structure has ligaments that facilitate dispersion of the solid particles through the porous foam structure between an inlet portion of the porous foam structure and an outlet portion of the porous foam structure.

6. The method of claim 5, wherein the step of releasing the curtain of solid particles includes releasing solid particles from at least one hopper through a slot.

7. The method of claim 5, wherein the stream of solid particles includes a mixture of natural solid particles and artificial solid particles.

8. The method of claim 5, wherein the step of increasing the resident time of the curtain of solid particles includes causing the solid particles to collide with the ligaments in the porous structure so as to impede movement of the solid particles and reduce speed of the solid particles.

9. The method of claim 5, wherein the step of increasing the resident time of the curtain of solid particles includes spreading the curtain of solid particles from a narrow configuration in a direction transverse to a direction of travel to a widened configuration in the direction transverse to the direction of travel.

10. The method of claim 5, wherein the step of increasing the resident time of the curtain of particles includes transferring heat to the particles with solar radiation during the resident time.

11. The method of claim 5, wherein the solid particles include sand.

12. The method of claim 5, wherein the solid particles are alumina beads.

13. The method of claim 5, wherein the porous foam structure includes a series of foam blocks.

14. The method of claim 5, wherein the porous foam structure includes a foam buffer.

15. The method of claim 13, wherein at least one foam block of the series of foam blocks is arranged at an angle with respect to a vertical axis.

16. A solid particle receiver configured to receive solid particles in a solar central receiver system, the solid particle receiver comprising:
    an inlet portion forming a passageway sized to receive a stream of solid particles;
    an outlet portion forming a passageway sized to transmit the stream of solid particles;
    a solid particle passageway between the inlet portion and the outlet portion; and
    a porous structure having a top face to receive the stream of solid particles and a front face to receive solar radiation, wherein the porous structure is in the solid particle passageway between the inlet portion and the outlet portion and is configured to transmit the solid particles throughout the porous structure, the porous structure having a porosity that impedes movement of the stream of solid particles during downward travel from the inlet portion to the outlet portion; wherein the inlet portion is above the outlet portion so that the stream of solid particles falls down, under the force of gravity, through the porous structure, and wherein the porous structure has ligaments that facilitate dispersion of the solid particles through the porous structure between the inlet portion and the outlet portion.

17. The solid particle receiver of claim 16, wherein the porous structure includes a series of foam blocks.

18. The solid particle receiver of claim 16, wherein the porous structure includes a foam buffer wherein the stream of solid particles enters the porous structure but does not enter the foam buffer.

19. The solid particle receiver of claim 16, wherein the porous structure includes a series of foam blocks and wherein at least one foam block of the series of foam blocks is arranged at an angle with respect to a vertical axis.

20. The solid particle receiver of claim 16, wherein a point of release of the stream of solid particles is recessed from the front face of the porous structure.

* * * * *